US010121091B2

United States Patent
Ell

(10) Patent No.: US 10,121,091 B2
(45) Date of Patent: Nov. 6, 2018

(54) IMU-AIDED IMAGE REGISTRATION

(71) Applicant: Rosemount Aerospace Inc., Burnsville, MN (US)

(72) Inventor: Todd Anthony Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/428,638

(22) Filed: Feb. 9, 2017

(65) Prior Publication Data

US 2018/0225540 A1 Aug. 9, 2018

(51) Int. Cl.
| | | |
|---|---|---|
| G06K 9/00 | (2006.01) | |
| G06K 9/46 | (2006.01) | |
| G06T 7/73 | (2017.01) | |
| G06T 7/246 | (2017.01) | |
| G01C 19/5776 | (2012.01) | |

(52) U.S. Cl.
CPC ....... *G06K 9/4604* (2013.01); *G01C 19/5776* (2013.01); *G06T 7/246* (2017.01); *G06T 7/73* (2017.01); *G06T 2207/10004* (2013.01)

(58) Field of Classification Search
CPC .... D04H 1/4209; D04H 1/4218; D04H 1/587; D04H 1/64; D04H 1/732; D21H 13/40; F41G 1/35; F41G 3/06; F41G 3/08; F41G 3/142; F41G 3/165; G01S 17/023; G01S 17/10; G01S 17/66; F42B 12/387
USPC ........................................................ 382/103
See application file for complete search history.

(56) References Cited

U.S. PATENT DOCUMENTS

| | | |
|---|---|---|
| 6,009,212 A | 12/1999 | Miller et al. |
| 7,653,214 B2 | 1/2010 | Schroeder et al. |
| 7,805,020 B2 | 9/2010 | Trudeau et al. |
| 8,946,606 B1 * | 2/2015 | Dennison ............... G01C 21/20 |
| | | 244/3.1 |
| 9,042,679 B2 | 5/2015 | Zuliani et al. |
| 9,384,552 B2 | 7/2016 | Zhou et al. |
| 2006/0006309 A1 | 1/2006 | Dimsdale et al. |
| 2013/0329087 A1 | 12/2013 | Tico et al. |

(Continued)

OTHER PUBLICATIONS

Brown, Lisa Gottesfeld. "A survey of image registration techniques". In: ACM computing surveys (CSUR) 24.4 (1992), pp. 352-376.

(Continued)

*Primary Examiner* — Manuchehr Rahmjoo
(74) *Attorney, Agent, or Firm* — Kinney & Lange, P.A.

(57) ABSTRACT

An imager device disposed on a moving body captures first image data at a first time and second image data at a second, subsequent time. An inertial measurement unit (IMU) disposed on the moving body senses motion of the moving body between the first time and the second time. The first image data is registered to the second image data based on inertial measurement data corresponding to the sensed motion to produce first registered image data. In response to identifying that image features are common to both the first registered image data and the second image data, the first registered image data is registered to the second image data based on the identified common features to produce output registered image data. In response to determining that no image features are common to both the first registered image data and the second image data, the first registered image data is output.

17 Claims, 4 Drawing Sheets

(56) References Cited

U.S. PATENT DOCUMENTS

2016/0195878 A1    7/2016  Peleg et al.
2016/0313435 A1*  10/2016  Smitherman .......... G01C 11/02

OTHER PUBLICATIONS

McInerney, Tim; Terzoploulos, Demetri, "Deformable models in medical image analysis: a survey". In: Medical image analysis 1.2 (1996), pp. 91-108.
Zitova, Barbara; Flusser, "Image registration methods: a survey". In: Image and vision computing 21.11 (2003), pp. 977-1000.
Balakirsky, Stephen B. and Chellappa, Rama "Performance characterization of image stabilization algorithms". In: Image Processing, 1996. Proceedings., International Conference on. vol. 1. IEEE. 1996, pp. 413-416.
Maintz, J.B. Antonie and Viergever, Max A. "A survey of medical image registration". In: Medical image analysis 2.1 (1998), pp. 1-36.
Extended European Search Report for European Patent Application No. 18153835.6, dated Apr. 9, 2018, 6 pages.

* cited by examiner

IMU-AIDED IMAGE REGISTRATION

BACKGROUND

This disclosure relates generally to image registration systems, and more particularly to image registration systems utilized for visual object tracking.

Many video analytics systems utilize automatic image registration techniques to geometrically align two images taken at different times, from different viewpoints, or both. For instance, imaging seekers used for, e.g., target tracking in weapon guidance systems, typically use automatic image registration to separate changes in object location from rotations of the seeker's field of view as captured by a sequence of images. Such image registration typically involves image feature selection and correspondence between stationary objects (often referred to as landmarks) in the field of view, as well as reshaping and resampling of one image to align it to the other image via a transformation function.

Image registration via stationary landmarks is hindered when no common landmarks are available within the field of view (e.g., over large bodies of water), or when repetitive landmarks make feature correspondence ambiguous, such as when the background field of view consists of repeating or tiled patterns. Accordingly, image registration for visual object tracking via image feature selection alone can decrease performance of the visual object tracking system to provide target and guidance information when the field of view passes over areas devoid of landmarks or having ambiguous landmark features.

SUMMARY

In one example, a method includes receiving first image data that is captured at a first time by an imager device disposed on a moving body, and receiving second image data that is captured by the imager device at a second time that is subsequent to the first time. The method further includes receiving inertial measurement data sensed by an inertial measurement unit (IMU) disposed on the moving body. The inertial measurement data corresponds to sensed motion of the moving body between the first time and the second time. The method further includes registering the first image data to the second image data based on the received inertial measurement data to produce first registered image data, and in response to identifying that image features are common to both the first registered image data and the second image data: registering the first registered image data to the second image data based on the identified features that are common to both the first registered image data and the second image data to produce second registered image data; and outputting the second registered image data as output registered image data. The method further includes outputting the first registered image data as the output registered image data in response to determining that no image features are common to both the first registered image data and the second image data.

In another example, a system includes an imager device disposed on a moving body, an inertial measurement unit (IMU) disposed on the moving body, one or more processors, and computer-readable memory. The computer-readable memory is encoded with instructions that, when executed by the one or more processors, cause the system to receive first image data that is captured at a first time by the imager device, receive second image data that is captured by the imager device at a second time that is subsequent to the first time, and receive inertial measurement data sensed by the IMU. The inertial measurement data corresponds to sensed motion of the moving body between the first time and the second time. The computer-readable memory is further encoded with instructions that, when executed by the one or more processors, cause the system to register the first image data to the second image data based on the received inertial measurement data to produce first registered image data, and in response to identifying that image features are common to both the first registered image data and the second image data: register the first registered image data to the second image data based on the identified features that are common to both the first registered image data and the second image data to produce second registered image data; and output the second registered image data as output registered image data. The computer-readable memory is further encoded with instructions that, when executed by the one or more processors, cause the system to output the first registered image data as the output registered image data in response to determining that no image features are common to both the first registered image data and the second image data.

DETAILED DESCRIPTION

According to techniques described herein, an image registration system includes an imager device and an inertial measurement unit (IMU) disposed on a moving body (e.g., a guided missile). The image registration system uses inertial measurement data sensed by the IMU corresponding to motion of the moving body to register image data captured by the imager device, thereby enabling registration of non-stationary or non-descriptive background scenes (e.g., wave motion in top down views or views of calm ocean surfaces) as well as scenes having ambiguous landmark features. As such, an image registration system implementing techniques of this disclosure can enable enhanced guidance and control commands for visual target tracking.

Figure 1:
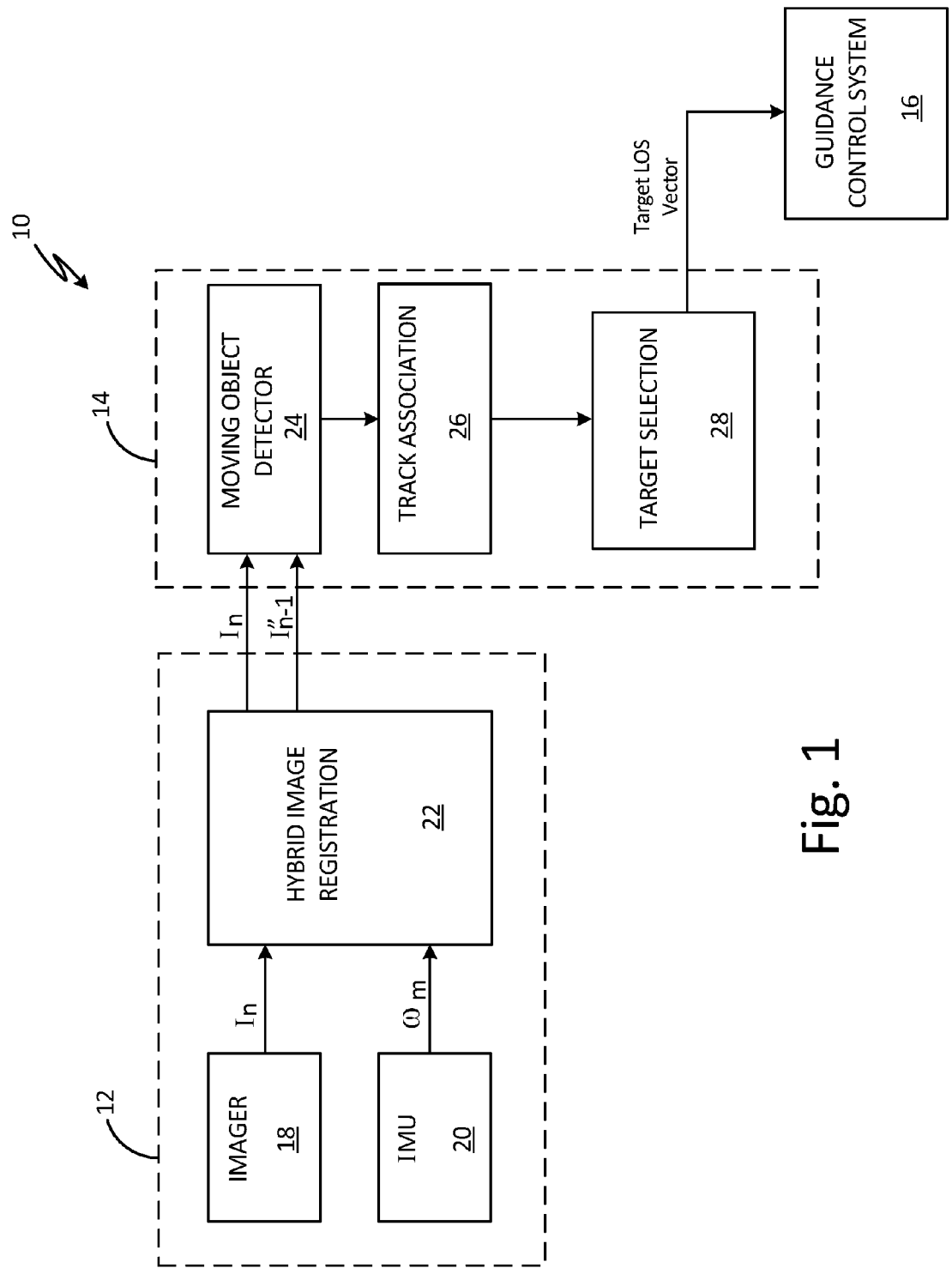
FIG. 1 is a schematic block diagram illustrating an example system including an image registration system, a visual object tracking system, and a guidance control system.

FIG. 1 is a schematic block diagram of system 10 including image registration system 12, visual object tracking system 14, and guidance control system 16. Image registration system 12 includes imager 18, inertial measurement unit (IMU) 20, and hybrid image registration module 22. Visual object tracking system 14 includes moving object detector 24, track association module 26, and target selection module 28. Each of image registration system 12, visual object tracking system 14, and guidance control system 16 can be disposed on a moving body, such as a guided missile, an aircraft, a land or water-based vehicle, or other moving body.

As is further described below, hybrid image registration module 22 of image registration system 12 utilizes inertial measurement data received from IMU 20 to register (e.g., align via translation and/or rotation operations) pixel location values of multiple images captured by imager device 18. The registered image data is provided to visual object tracking system 14, which provides a line-of-sight vector (e.g., via pixel coordinates) of a selected moving target within the field of view of imager device 18 to guidance control system 16. Guidance control system 16 modifies a trajectory of the moving body based on the received line-of-sight vector to intercept the target.

Imager device 18 can be any image capturing device configured to capture image data (e.g., visible spectrum image data, infra-red spectrum image data, or other image data) within a field of view of imager device 18 at an image capture frequency sufficient to enable visual tracking and guidance of the moving body to intercept an identified target, such as 10 Hertz (Hz), 20 Hz, or other image capture frequencies. IMU 20 can include a plurality of rate gyroscopes, accelerometers, or other sensors configured to sense relative motion of the moving body. For instance, as is further described below, IMU 20 can include three rate gyroscopes, each aligned to sense a rotational rate along one of three mutually-orthogonal axes. IMU 20 can be positioned on the moving body such that the three mutually-orthogonal axes correspond to a pitch axis, a roll axis, and a yaw axis of the moving body.

Hybrid image registration module 22 can be implemented in hardware, software, or combinations of hardware and software. For instance, hybrid image registration can be implemented via a controller device disposed on the moving body. The controller device can include, e.g., one or more processors and computer-readable memory encoded with instructions that, when executed by the one or more processors, cause the controller device to implement techniques described herein with respect to hybrid image registration module 22. Similarly, moving object detector 24, track association module 26, target selection module 28, and guidance control system 16 can each be implemented via one or more processors and computer-readable memory of a same or different controller device(s).

In operation, imager device 18 captures image data at an image capture frequency (e.g., 10 Hz, 20 Hz, or other image capture frequency) during motion of the moving body. Imager device 18 provides the captured image data ($I_n$) corresponding to a most recent image capture to hybrid image registration module 22. In addition, IMU 20 senses angular motion of the moving body via the plurality of (e.g., three) rate gyroscopes configured to sense motion along the plurality of mutually-orthogonal axes. IMU 20 provides inertial measurement data corresponding to the sensed angular rates in the form of angular rate vector $\omega_m$ to hybrid image registration module 22. That is, angular rate vector $\omega_m$ includes a plurality of angular rates, each corresponding to a sensed angular rate from one of the plurality of rate gyroscopes of IMU 20.

Hybrid image registration module 22 utilizes the received angular rate vector $\omega_m$ to register previously-received image data from imager device 18 (e.g., image data corresponding to a sequentially-previous image captured at the image capture frequency) with image data $I_n$, as is further described below. Hybrid image registration module 22 outputs image data $I_n$ and the registered image data $I''_{n-1}$ to moving object detector 24. Moving object detector 24 identifies one or more moving objects within the overlapping portions of image data $I_n$ and registered image data $I''_{n-1}$ using visual simultaneous location and mapping (VSLAM) algorithms, detection and tracking of moving objects (DATMO) algorithms, or other visual object tracking algorithms.

Moving object detector 24 provides locations (e.g., pixel locations) of the one or more identified moving objects to track association module 26, which associates the identified moving objects with one or more existing target tracks via a nearest neighbor track association algorithm, a probabilistic data association algorithm, a multiple hypothesis tracking algorithm, an interactive multiple model (IMM) algorithm, or other track association algorithm. Track association module 26 provides coordinates (e.g., pixel location values) of the track history of each target track to target selection module 28. Target selection module 28 identifies a selected target via synthetic discriminant functions or other target selection logic.

Target selection module 28 provides pixel coordinates of the selected target to guidance control system 16. The pixel coordinates correspond to a target line-of-sight vector from imager device 18 (e.g., positioned to be forward looking on the moving body) to the selected target via a known number of pixels of captured image data from imager device 18 per degree of a field of view of imager device 18. Guidance control system 16 modifies a trajectory of the moving body (e.g., via control commands to flight control surfaces or controllable thrust vectoring systems of the moving body) to intercept the selected target using the received line-of-sight vector (or equivalently, the pixel coordinate values of the selected target).

Accordingly, system 10 implementing image registration system 12 can enable enhanced guidance and control commands for visual target tracking by effectively registering background images captured by imager device 18 even when a field of view of imager device 18 includes areas devoid of landmarks or areas having ambiguous landmark features.

Figure 2:
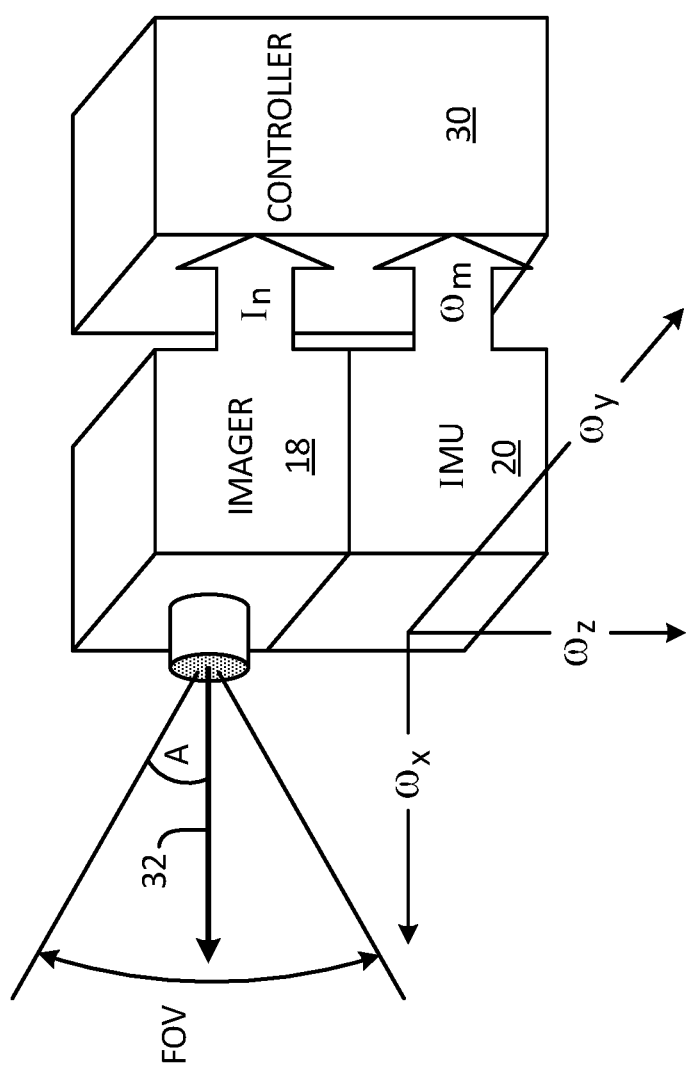
FIG. 2 is a block diagram illustrating an example imager device and inertial measurement unit (IMU) that are configured to provide image data and inertial measurement data to a controller device.

FIG. 2 is a block diagram illustrating an example of imager device 18 and IMU 20 configured to provide image data and inertial measurement data to controller device 30. As illustrated in FIG. 2, imager device 18 includes optical components configured to capture image data within a field of view (FOV) centered about boresight 32. While illustrated 2-dimensionally in FIG. 2, it should be understood that the field of view of imager device 18 is a conical field of view centered about boresight 32 having an angular component A ranging from zero degrees to 90 degrees depending upon the optical implementation.

IMU 20, in the example of FIG. 2, includes three rate gyroscopes, each configured to sense angular motion along one of the three mutually-orthogonal axes $\omega_x$, $\omega_y$, and $\omega_z$. As illustrated in FIG. 2, IMU 20 can be positioned such that one of the three mutually-orthogonal axes (w, in this example) is aligned with boresight 32. Imager device 18 and IMU 20 can be disposed on the moving body (e.g., directly adjacent or separate). Imager device 18 can be disposed on the moving body such that boresight 32 is aligned with a forward direction of motion of the moving body (e.g., straight and level flight). In such examples, a rotational rate sensed by IMU 20 about axis $\omega_x$ aligned with boresight 32 can correspond to a rolling motion of the moving body, a rotational rate sensed by IMU 20 about axis $\omega_y$ can correspond to a pitching motion of the moving body, and a rotational rate sensed by IMU 20 about axis $\omega_z$ can correspond to a yawing motion of the moving body.

Imager 18 and IMU 20 are each operatively coupled (e.g., electrically and/or communicatively coupled) with controller device 30. Controller device 30 can include one or more processors and computer-readable memory encoded with instructions that, when executed by the one or more processors, cause controller device 30 to operate in accordance with techniques described herein. Examples of the one or more processors include any one or more of a microprocessor, a digital signal processor (DSP), an application specific integrated circuit (ASIC), a field-programmable gate array (FPGA), or other equivalent discrete or integrated logic circuitry. Computer-readable memory of controller device 30 can be configured to store information within controller device 30 during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of controller device 30 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories.

As illustrated in FIG. 2, imager device 18 provides image data $I_n$ to controller device 30 at an image capture frequency, such as 10 Hz. IMU 20 provides inertial measurement data in the form of angular rate vector $\omega_m$ to controller 30 at a frequency that, in some examples, is greater than or equal to the image capture frequency. Controller 30 executes computer-readable instructions to implement hybrid image registration module 22 (FIG. 1) that registers (e.g., aligns via translation and/or rotation operations) pixel coordinates of a sequentially-previous image capture with image data $I_n$ using the received angular rate vector $\omega_m$. Controller 30 outputs image data $I_n$ as well as the registered image data $I''_{n-1}$ for use by visual object tracking system 14 (FIG. 1) to provide relative location information of a selected target within the field of view of imager device 18.

Figure 3:
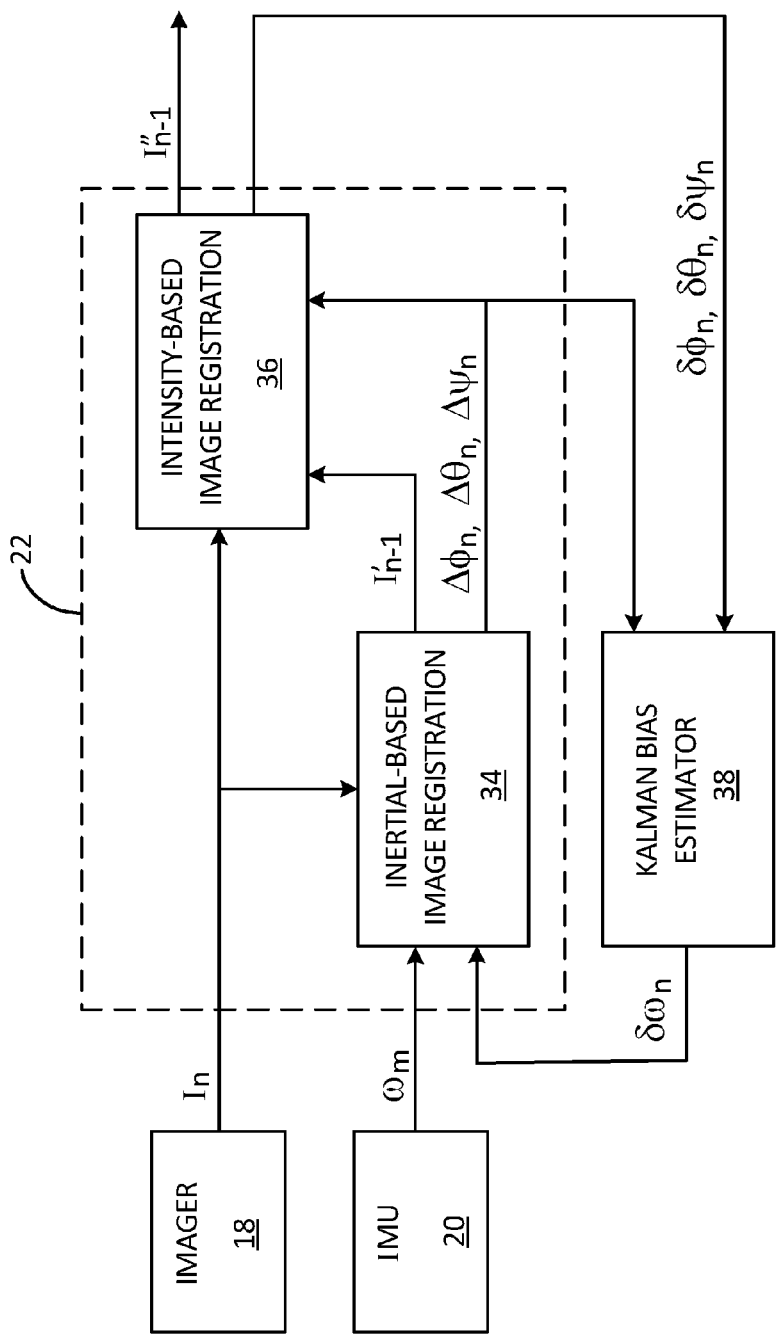
FIG. 3 is a schematic block diagram illustrating an example hybrid image registration module that utilizes an inertial-based image registration module and an intensity-based image registration module to register image data captured by the imager device.

FIG. 3 is a schematic block diagram illustrating an example of hybrid image registration module 22 that utilizes inertial-based image registration module 34 and intensity-based image registration module 36 to register image data captured by imager device 18. As illustrated in FIG. 3, hybrid image registration module 22 receives captured image data $I_n$ from imager device 18 and inertial measurement data in the form of angular rate vector $\omega_m$ from IMU 20. In addition, hybrid image registration module 22 receives angular rate corrections vector $\delta\omega_n$ from Kalman bias estimator 38.

Inertial-based image registration module 34 receives, as inputs, image data $I_n$ from imager device 18, angular rate vector $\omega_m$ from IMU 20, and angular rate corrections vector $\delta\omega_n$ from Kalman bias estimator 38. Inertial-based image registration module 34 provides, as outputs, inertial-based registered image data $I'_{n-1}$ to intensity-based image registration module 36 and an angular rotation vector including angular roll displacement $\Delta\phi_n$, angular pitch displacement $\Delta\theta_n$, and angular yaw displacement $\Delta\psi_n$ to each of intensity-based image registration module 36 and Kalman bias estimator 38. Intensity-based image registration module 36 receives, as inputs, image data $I_n$ from imager device 18, as well as inertial-based registered image data $I'_{n-1}$ and the angular rotation vector including angular roll displacement $\Delta\phi_n$, angular pitch displacement $\Delta\theta_n$, and angular yaw displacement $\Delta\psi_n$ from inertial-based image registration module 34. Intensity-based image registration module 36 provides, as outputs, registered output image data $I''_{n-1}$ to visual object tracking system 14 (FIG. 1) and an image-based angular displacement vector including image-based roll displacement $\delta\phi_n$, image-based pitch displacement $\delta\theta_n$, and image-based yaw displacement $\delta\psi_n$ to Kalman bias estimator 38. Kalman bias estimator 38 receives, as inputs, the angular rotation vector including angular roll displacement $\Delta\phi_n$, angular pitch displacement $\Delta\theta_n$, and angular yaw displacement $\Delta\psi_n$ from inertial-based image registration module 34, as well as the image-based angular displacement vector including image-based roll displacement $\delta\phi_n$, image-based pitch displacement $\delta\theta_n$, and image-based yaw displacement $\delta\psi_n$ from intensity-based image registration module 36. Kalman bias estimator provides, as output, angular rate corrections vector $\delta\omega_n$ to inertial-based image registration module 34.

In operation, inertial-based image registration module 34 utilizes angular rate vector $\omega_m$ as well as angular rate corrections vector $\delta\omega_n$ to produce the angular rotation vector including angular roll displacement $\Delta\phi_n$, angular pitch displacement $\Delta\theta_n$, and angular yaw displacement $\Delta\psi_n$. Inertial-based image registration module 34 utilizes the angular rotation vector to register captured image data received from imager device 18 that is delayed by a time duration corresponding to (e.g., equal to) the image capture frequency of imager device 18 (often referred to as a last-pass image frame) with image data $I_n$ corresponding to most recent image data captured by imager device 18 (often referred to as a current image frame) to produce inertial-based registered image data $I'_{n-1}$, as is further described below.

Intensity-based image registration module 36 determines whether image features are common to both image data $I_n$ and inertial-based registered image data $I'_{n-1}$. Image features can include, among others, lines, curves, intersections of lines, or other scale-invariant landmark image features. For example, intensity-based image registration module 36 can identify scale-invariant image features in each of image data $I_n$ and inertial-based registered image data $I'_{n-1}$ using one or more feature selection algorithms, such as the scale-invariant feature transform (SIFT) algorithm, the affine scale invariant feature transform (ASIFT) algorithm, the fast clustering feature selection (FAST) algorithm, the speeded-up robust features (SURF) algorithm, or other feature selection algorithms.

Intensity-based image registration module 36 determines whether identified image features are common to both image data $I_n$ and inertial-based registered image data $I'_{n-1}$ using a random sample and consensus (RANSAC) or other algorithm to determine whether any translation and/or rotation transformation exists to align the identified features. In response to determining that features (e.g., three or more features) are common to both image data $I_n$ and inertial-based registered image data $I'_{n-1}$, intensity-based image registration module 36 applies the identified translation and/or rotation transformation to pixel coordinate values of inertial-based registered image data $I'_{n-1}$ to produce registered output image data $I''_{n-1}$ that is provided to visual object tracking system 14 (FIG. 1). Translation and rotation operations applied by intensity-based image registration module 36 to inertial-based registered image data $I'_{n-1}$ are provided to Kalman bias estimator 38 as an image-based angular displacement vector including image-based roll displacement $\delta\phi_n$, image-based pitch displacement $\delta\theta_n$, and image-based yaw displacement $\delta\psi_n$.

In examples where intensity-based image registration module 36 determines that no image features are common to both image data $I_n$ and inertial-based registered image data $I'_{n-1}$ (or that feature correspondence is ambiguous), intensity-based image registration module 36 outputs inertial-based registered image data $I'_{n-1}$ as the registered output image data $I''_{n-1}$. That is, in response to determining that no image features are common to both image data $I_n$ and inertial-based registered image data $I'_{n-1}$ (or that feature correspondence is ambiguous), intensity-based image registration module 36 passes the inertial-based registered image data $I'_{n-1}$ to visual object tracking system 14 as the registered output image data $I''_{n-1}$.

As illustrated in FIG. 3, intensity-based image registration module 36 determines image-based angular displacement vector including image-based roll displacement $\delta\phi_n$, image-based pitch displacement $\delta\theta_n$, and image-based yaw displacement $\delta\psi_n$ based on the identified translation and/or rotation transformation applied during image registration of inertial-based registered image data $I'_{n-1}$ to image data $I_n$. Intensity-based image registration module 36 provides the image-based angular displacement vector to Kalman bias estimator 38. Kalman bias estimator 38 implements an extended Kalman filter that produces a Kalman state vector including angular rate corrections based on a difference between the angular rotation vector including angular roll displacement $\Delta\phi_n$, angular pitch displacement $\Delta\theta_n$, and angular yaw displacement $\Delta\psi_n$, and the image-based angular displacement vector including image-based roll displacement $\delta\phi_n$, image-based pitch displacement $\delta\theta_n$, and image-based yaw displacement $\delta\psi_n$. That is, because the image-based angular displacement vector determined based on feature selection and correspondence may typically have high angular resolution (e.g., due to a density of pixels of image data captured by imager device 18), the image-based angular displacement vector including image-based roll displacement $\delta\phi_n$, image-based pitch displacement $\delta\theta_n$, and image-based yaw displacement $\delta\psi_n$ can be utilized by Kalman bias estimator 38 to determine angular rate corrections vector $\delta\psi_n$. As is further described below, angular rate corrections vector $\delta\psi_n$ is utilized by inertial-based image registration module 34 during integration operations of angular rate vector $\omega_m$ received from IMU 20 to offset random-walk or other stochastic drift errors that may accumulate within the rate gyroscopes of IMU 20, thereby increasing accuracy of subsequent operations by inertial-based image registration module 34 to produce inertial-based registered image data $I'_{n-1}$.

Accordingly, hybrid image registration module 22, implementing techniques of this disclosure, can enable registration of non-stationary or non-descriptive background scenes in which common image features are absent as well as scenes having ambiguous image features that may otherwise prevent unambiguous image registration. In examples where common scale-invariant image features are identified between image capture frames, intensity-based image registration via feature selection and correspondence can improve accuracy of the image registration techniques to produce the registered output image data $I''_{n-1}$ as well as the accuracy of subsequent operations to produce inertial-based registered image data $I'_{n-1}$. In examples where common scale-invariant image features are not identified (or where feature correspondence is ambiguous), hybrid image registration module 22 can provide the inertial-based registered image data $I'_{n-1}$ for use by visual object tracking system 14.

Figure 4:
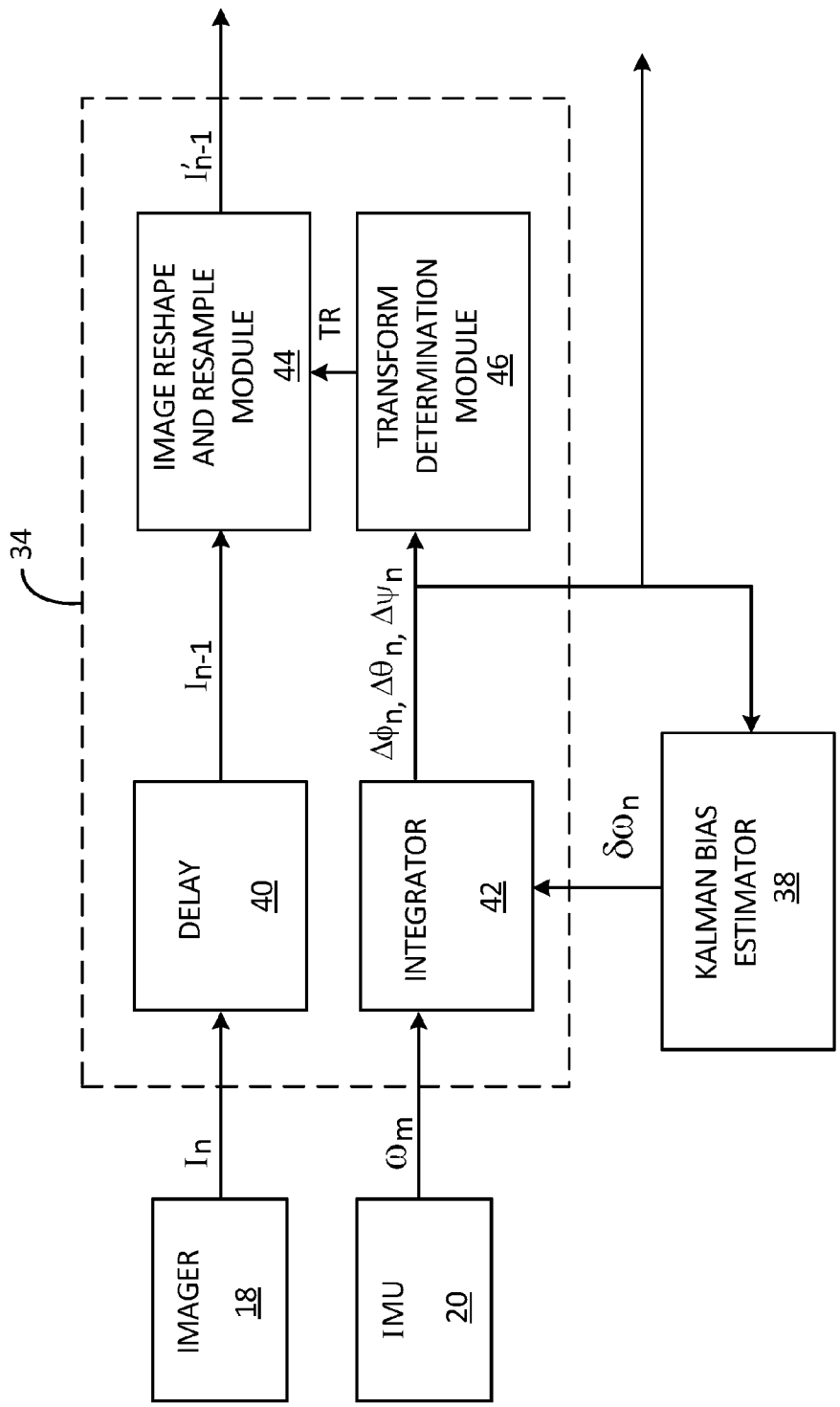
FIG. 4 is a schematic block diagram illustrating an example inertial-based image registration module that produces registered image data based on image data captured by the imager device and inertial measurement data sensed by the IMU.

FIG. 4 is a schematic block diagram illustrating an example of inertial-based image registration module 34 that produces inertial-based registered image data $I'_{n-1}$ based on image data $I_n$ captured by imager device 18 and inertial measurement data provided by IMU 20 in the form of angular rate vector $\psi_m$. As illustrated in FIG. 4, inertial-based image registration module 34 includes delay 40, integrator 42, image reshape and resample module 44, and transform determination module 46.

Delay 40 receives image data image data $I_n$ as input from imager device 18 and provides last-pass image data $I_{n-1}$ as output to image reshape and resample module 44. Integrator 42 receives, as inputs, angular rate vector $\omega_m$ from IMU 20 and angular rate corrections vector $\delta\omega_n$ from Kalman bias estimator 38. Integrator 42 provides an angular rotation vector including angular roll displacement $\Delta\phi_n$, angular pitch displacement $\Delta\theta_n$, and angular yaw displacement $\Delta\psi_n$ as output to transform determination module 46, Kalman bias estimator 38, and intensity-based image registration module 36 (FIG. 3).

In operation, delay 40 time-delays image data $I_n$ received from imager device 18 by a time interval corresponding to (e.g., equal to) the image capture frequency of imager device 18 to produce last-pass image data $I_{n-1}$ that is provided to image reshape and resample module 44. Integrator 42 integrates angular rate vector $\omega_m$ received from IMU 20 over the time interval utilized by delay 40 (e.g., a time interval equal to the image capture frequency of imager device 18). In addition, integrator 42 applies angular rate corrections vector $\delta\omega_n$ received from Kalman bias estimator 38 during the integration operations to offset errors accumulated by rate gyroscopes of IMU 20 during operation. For example, angular rate vector $\omega_m$ can include three angular rate values. Each of the three angular rate values can correspond to one of three sensed angular rates along the three mutually-orthogonal axes $\omega_x$, $\omega_y$, and $\omega_z$ (FIG. 2), $\omega_x$ corresponding to a rolling motion of the moving body, $\omega_y$ corresponding to a pitching motion of the moving body, and $\omega_z$ corresponding to a yawing motion of the moving body. Angular rate corrections vector $\delta\omega_n$ can similarly include three angular rate correction values, each corresponding to one of the three sensed angular rates about the three axes $\omega_x$, $\omega_y$, and $\omega_z$. Integrator 42, in such examples, integrates each of the three angular rate values over the time interval utilized by delay 40 (e.g., equal to the image capture frequency of imager device 18) and subtracts the corresponding sensed angular rate correction value to produce an angular rotation vector including angular roll displacement $\delta\phi_n$ (i.e., corresponding to integration of the angular rate value about axis $\omega_x$), angular pitch displacement $\Delta\theta_n$ (i.e., corresponding to integration of the angular rate value about axis $\omega_y$), and angular yaw displacement $\Delta\psi_n$ (i.e., corresponding to integration of the angular rate value about axis $\omega_z$). Integrator 42 provides the angular rotation vector to transform determination module 46.

Transform determination module 46 forms translation and rotation matrix TR that is provided to image reshape and resample module 44. Translation and rotation matrix TR can be expressed according to the following equation:

$$TR = \begin{bmatrix} k\Delta\psi_n & \cos\Delta\phi_n & -\sin\Delta\phi_n \\ k\Delta\theta_n & \sin\Delta\phi_n & \cos\Delta\phi_n \end{bmatrix} \quad \text{Equation (1)}$$

where k is a number of pixels per degree of a field of view imager device 18, $\Delta\psi_n$ is the angular yaw displacement of the angular rotation vector received from integrator 42, $\Delta\theta_n$ is the angular pitch displacement of the angular rotation vector received from integrator 42, and $\phi_n$ the angular roll displacement of the angular rotation vector received from integrator 42. As such, translation and rotation matrix TR represents both translation operations (i.e., via the first column of translation and rotation matrix TR) and rotation operations (i.e., via the second and third columns of translation and rotation matrix TR). Though described herein as defining a single matrix TR that represents both translation and rotation operations, in other examples, transform determination module 46 can define multiple transformation functions to perform the translation and rotation operations, such as a first matrix corresponding to the translation operations and a second matrix corresponding to the rotation operations.

Image reshape and resample module 44 applies translation and rotation matrix TR received from transform determination module 46 to image pixel location coordinate values of last-pass image data $I_{n-1}$ received from delay 40 to produce inertial-based registered image data $I'_{n-1}$. For example, image reshape and resample module 44 can apply translation and rotation matrix TR to each image pixel location coordinate value of last-pass image data $I_{n-1}$ according to the following equation:

$$\begin{bmatrix} x' \\ y' \end{bmatrix} = \begin{bmatrix} k\Delta\psi_n & \cos\Delta\phi_n & -\sin\Delta\phi_n \\ k\Delta\theta_n & \sin\Delta\phi_n & \cos\Delta\phi_n \end{bmatrix} \begin{bmatrix} 1 \\ x \\ y \end{bmatrix} \quad \text{Equation (2)}$$

where x' is the resulting horizontal pixel location coordinate value of the respective pixel of inertial-based registered image data $I'_{n-1}$, y' is the resulting vertical pixel location coordinate value of the respective pixel of inertial-based registered image data $I'_{n-1}$, $$\begin{bmatrix} k\Delta\psi_n & \cos\Delta\phi_n & -\sin\Delta\phi_n \\ k\Delta\theta_n & \sin\Delta\phi_n & \cos\Delta\phi_n \end{bmatrix}$$

is the translation and rotation matrix TR received from transform determination module 46, x is the horizontal pixel location coordinate value of the respective pixel of last-pass image data $I_{n-1}$, and y is the vertical pixel location coordinate value of the respective pixel of last-pass image data $I_{n-1}$. In some examples, Equation (2) above can result in fractional pixel location coordinate values. In such examples, image reshape and resample module 44 can resample the image intensity values of the resulting image via two-dimensional interpolation at integer pixel location coordinate values to produce inertial-based registered image data $I'_{n-1}$.

Image reshape and resample module 44 provides inertial-based registered image data $I'_{n-1}$ to intensity-based image registration module 36 of hybrid image registration module 22 (FIG. 2), thereby enabling registration of non-stationary or non-descriptive background scenes, as well as scenes having ambiguous landmark features based on inertial measurement data received from IMU 20. Techniques of this disclosure can therefore enable enhanced guidance and control commands for visual target tracking.

Discussion of Possible Embodiments

The following are non-exclusive descriptions of possible embodiments of the present invention.

A method includes receiving first image data that is captured at a first time by an imager device disposed on a moving body, and receiving second image data that is captured by the imager device at a second time that is subsequent to the first time. The method further includes receiving inertial measurement data sensed by an inertial measurement unit (IMU) disposed on the moving body. The inertial measurement data corresponds to sensed motion of the moving body between the first time and the second time. The method further includes registering the first image data to the second image data based on the received inertial measurement data to produce first registered image data, and in response to identifying that image features are common to both the first registered image data and the second image data: registering the first registered image data to the second image data based on the identified features that are common to both the first registered image data and the second image data to produce second registered image data; and outputting the second registered image data as output registered image data. The method further includes outputting the first registered image data as the output registered image data in response to determining that no image features are common to both the first registered image data and the second image data.

The method of the preceding paragraph can optionally include, additionally and/or alternatively, any one or more of the following features, configurations, operations, and/or additional components:

Registering the first image data to the second image data based on the received inertial measurement data can include applying translation and rotation operations to pixel locations of the first image data based on the received inertial measurement data.

The translation operations can correspond to pitching and yawing motion of the moving body between the first time and the second time. The rotation operations can correspond to rolling motion of the moving body between the first time and the second time.

Applying the translation and rotation operations can include applying a translate-rotate matrix to coordinates of pixel locations of the first image data. The translate-rotate matrix can be:

$$\begin{bmatrix} k\Delta\psi_n & \cos\Delta\phi_n & -\sin\Delta\phi_n \\ k\Delta\theta_n & \sin\Delta\phi_n & \cos\Delta\phi_n \end{bmatrix}.$$

K can be a number of pixels per degree of a field of view of the imager device. $\Delta\psi_n$ can be an angular displacement sensed by the IMU between the first time and the second time along an axis corresponding to a yaw axis of the moving body. $\Delta\theta_n$ can be an angular displacement sensed by the IMU between the first time and the second time along an axis corresponding to a pitch axis of the moving body. $\Delta\phi_n$ can be an angular displacement sensed by the IMU between the first time and the second time along an axis corresponding to a roll axis of the moving body.

The method can further include resampling the registered first image data subsequent to applying the translation and rotation operations to the coordinates of the pixel locations.

Receiving the inertial measurement data sensed by the IMU can include receiving angular rate data sensed by the IMU along three mutually-orthogonal axes.

Registering the first image data to the second image data based on the received inertial measurement data can include integrating the sensed angular rate data from the first time to the second time to produce angular displacement data, and registering the first image data to the second image data based on the angular displacement data.

Registering the first registered image data to the second image data based on the identified features that are common to both the first registered image data and the second image data can include determining image-based angular displacement data. The method can further include determining angular rate correction data based on the angular displacement data and the image-based angular displacement data. Integrating the sensed angular rate data from the first time to the second time to produce the angular displacement data can include applying the angular rate correction data to the sensed angular rate data.

The imager device can have a field of view centered about a central boresight. The IMU can include a plurality of rate gyroscopes. Each of the plurality of rate gyroscopes can be configured to sense rotational rate of the IMU along one of a plurality of mutually-orthogonal axes. One of the plurality of mutually-orthogonal axes can be aligned with the central boresight of the imager device.

The method can further include: identifying a target within the second image data and the output registered image data; determining a line-of-sight vector from the imager device to the target based on pixel locations of the identified target within the second image data and the output registered image data; and providing the line-of-sight vector to a guidance control system configured to control motion of the moving body.

The method can further include modifying a trajectory of the moving body based on the line-of-sight vector provided to the guidance control system.

The method can further include determining, based on pixel locations of the identified target within the second image data and the output registered image data, that the identified target is moving. Modifying the trajectory of the moving body based on the line-of-sight vector can include modifying the trajectory of the moving body to intercept the identified target.

A system includes an imager device disposed on a moving body, an inertial measurement unit (IMU) disposed on the moving body, one or more processors, and computer-readable memory. The computer-readable memory is encoded with instructions that, when executed by the one or more processors, cause the system to receive first image data that is captured at a first time by the imager device, receive second image data that is captured by the imager device at a second time that is subsequent to the first time, and receive inertial measurement data sensed by the IMU. The inertial measurement data corresponds to sensed motion of the moving body between the first time and the second time. The computer-readable memory is further encoded with instructions that, when executed by the one or more processors, cause the system to register the first image data to the second image data based on the received inertial measurement data to produce first registered image data, and in response to identifying that image features are common to both the first registered image data and the second image data: register the first registered image data to the second image data based on the identified features that are common to both the first registered image data and the second image data to produce second registered image data; and output the second registered image data as output registered image data. The computer-readable memory is further encoded with instructions that, when executed by the one or more processors, cause the system to output the first registered image data as the output registered image data in response to determining that no image features are common to both the first registered image data and the second image data.

The system of the preceding paragraph can optionally include, additionally and/or alternatively, any one or more of the following features, configurations, operations, and/or additional components:

The computer-readable memory can be further encoded with instructions that, when executed by the one or more processors, cause the system to register the first image data to the second image data based on the received inertial measurement data by at least causing the system to apply translation and rotation operations to pixel locations of the first image data based on the received inertial measurement data.

The translation operations can correspond to pitching and yawing motion of the moving body between the first time and the second time. The rotation operations can correspond to rolling motion of the moving body between the first time and the second time.

The imager device can have a field of view centered about a central boresight. The IMU can include a plurality of rate gyroscopes. Each of the plurality of rate gyroscopes can be configured to sense rotational rate of the IMU along one of a plurality of mutually-orthogonal axes. One of the plurality of mutually-orthogonal axes can be aligned with the central boresight of the imager device.

The computer-readable memory can be further encoded with instructions that, when executed by the one or more processors, cause the system to register the first image data to the second image data based on the received inertial measurement data by at least causing the system to: integrate the sensed rotational rate of the IMU from the first time to the second time to produce angular displacement data; and register the first image data to the second image data based on the angular displacement data.

The computer-readable memory can be further encoded with instructions that, when executed by the one or more processors, cause the system to: identify a target within the second image data and the output registered image data; determine a line-of-sight vector from the imager device to the target based on pixel locations of the identified target within the second image data and the output registered image data; and output guidance and control commands configured to modify a trajectory of the moving body based on the line-of-sight vector.

The computer-readable memory can be further encoded with instructions that, when executed by the one or more processors, cause the system to: determine, based on pixel locations of the identified target within the second image data and the output registered image data, that the identified target is moving; and output the guidance and control commands configured to modify the trajectory of the moving body based on the line-of-sight vector to intercept the identified target.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
   receiving first image data that is captured at a first time by an imager device disposed on a moving body;
   receiving second image data that is captured by the imager device at a second time that is subsequent to the first time;
   receiving inertial measurement data sensed by an inertial measurement unit (IMU) disposed on the moving body, the inertial measurement data corresponding to sensed motion of the moving body between the first time and the second time;
   registering the first image data to the second image data based on the received inertial measurement data to produce first registered image data;
   in response to identifying that image features are common to both the first registered image data and the second image data:
      registering the first registered image data to the second image data based on the identified features that are common to both the first registered image data and the second image data to produce second registered image data; and
      outputting the second registered image data as output registered image data; and
   outputting the first registered image data as the output registered image data in response to determining that no image features are common to both the first registered image data and the second image data;
   identifying a target within the second image data and the output registered image data;
   determining a line-of-sight vector from the imager device to the target based on pixel locations of the identified target within the second image data and the output registered image data; and
   providing the line-of-sight vector to a guidance control system configured to control motion of the moving body; and
   modifying a trajectory of the moving body based on the line-of-sight vector provided to the guidance control system.

2. The method of claim 1,
   wherein registering the first image data to the second image data based on the received inertial measurement data comprises applying translation and rotation operations to pixel locations of the first image data based on the received inertial measurement data.

3. The method of claim 2,
   wherein the translation operations correspond to pitching and yawing motion of the moving body between the first time and the second time; and
   wherein the rotation operations correspond to rolling motion of the moving body between the first time and the second time.

4. The method of claim 2,
   wherein applying the translation and rotation operations comprises applying a translate-rotate matrix to coordinates of pixel locations of the first image data.

5. The method of claim 4,
   wherein the translate-rotate matrix is:

$$\begin{bmatrix} k\Delta\psi_n & \cos\Delta\phi_n & -\sin\Delta\phi_n \\ k\Delta\theta_n & \sin\Delta\phi_n & \cos\Delta\phi_n \end{bmatrix}$$

wherein k is a number of pixels per degree of a field of view of the imager device;
   wherein $\Delta\psi_n$ is an angular displacement sensed by the IMU between the first time and the second time along an axis corresponding to a yaw axis of the moving body;
   wherein $\Delta\theta_n$ is an angular displacement sensed by the IMU between the first time and the second time along an axis corresponding to a pitch axis of the moving body; and
   wherein $\Delta\phi_n$ is an angular displacement sensed by the IMU between the first time and the second time along an axis corresponding to a roll axis of the moving body.

6. The method of claim 2, further comprising:
   resampling the registered first image data subsequent to applying the translation and rotation operations to the coordinates of the pixel locations.

7. The method of claim 1,
   wherein receiving the inertial measurement data sensed by the IMU comprises receiving angular rate data sensed by the IMU along three mutually-orthogonal axes.

8. The method of claim 7,
   wherein registering the first image data to the second image data based on the received inertial measurement data comprises:
      integrating the sensed angular rate data from the first time to the second time to produce angular displacement data; and
      registering the first image data to the second image data based on the angular displacement data.

9. The method of claim 8, wherein registering the first registered image data to the second image data based on the identified features that are common to both the first registered image data and the second image data comprises determining image-based angular displacement data, the method further comprising:
   determining angular rate correction data based on the angular displacement data and the image-based angular displacement data;
   wherein integrating the sensed angular rate data from the first time to the second time to produce the angular displacement data comprises applying the angular rate correction data to the sensed angular rate data.

10. The method of claim 1,
    wherein the imager device has a field of view centered about a central boresight;
    wherein the IMU includes a plurality of rate gyroscopes, each of the plurality of rate gyroscopes configured to sense rotational rate of the IMU along one of a plurality of mutually-orthogonal axes; and
    wherein one of the plurality of mutually-orthogonal axes is aligned with the central boresight of the imager device.

11. The method of claim 1, further comprising:
    determining, based on pixel locations of the identified target within the second image data and the output registered image data, that the identified target is moving;
    wherein modifying the trajectory of the moving body based on the line-of-sight vector comprises modifying the trajectory of the moving body to intercept the identified target.

12. A system comprising:
    an imager device disposed on a moving body;
    an inertial measurement unit (IMU) disposed on the moving body;
    one or more processors; and computer-readable memory encoded with instructions that, when executed by the one or more processors, cause the system to:
  receive first image data that is captured at a first time by the imager device;
  receive second image data that is captured by the imager device at a second time that is subsequent to the first time;
  receive inertial measurement data sensed by the IMU, the inertial measurement data corresponding to sensed motion of the moving body between the first time and the second time;
  register the first image data to the second image data based on the received inertial measurement data to produce first registered image data;
  in response to identifying that image features are common to both the first registered image data and the second image data:
    register the first registered image data to the second image data based on the identified features that are common to both the first registered image data and the second image data to produce second registered image data; and
    output the second registered image data as output registered image data; and
  output the first registered image data as the output registered image data in response to determining that no image features are common to both the first registered image data and the second image data;
  identify a target within the second image data and the output registered image data;
  determine a line-of-sight vector from the imager device to the target based on pixel locations of the identified target within the second image data and the output registered image data; and
  output guidance and control commands configured to modify a trajectory of the moving body based on the line-of-sight vector.

13. The system of claim 12,
wherein the computer-readable memory is further encoded with instructions that, when executed by the one or more processors, cause the system to register the first image data to the second image data based on the received inertial measurement data by at least causing the system to apply translation and rotation operations to pixel locations of the first image data based on the received inertial measurement data.

14. The system of claim 13,
wherein the translation operations correspond to pitching and yawing motion of the moving body between the first time and the second time; and
wherein the rotation operations correspond to rolling motion of the moving body between the first time and the second time.

15. The system of claim 12,
wherein the imager device has a field of view centered about a central boresight;
wherein the IMU includes a plurality of rate gyroscopes, each of the plurality of rate gyroscopes configured to sense rotational rate of the IMU along one of a plurality of mutually-orthogonal axes; and
wherein one of the plurality of mutually-orthogonal axes is aligned with the central boresight of the imager device.

16. The system of claim 15,
wherein the computer-readable memory is further encoded with instructions that, when executed by the one or more processors, cause the system to register the first image data to the second image data based on the received inertial measurement data by at least causing the system to:
  integrate the sensed rotational rate of the IMU from the first time to the second time to produce angular displacement data; and
  register the first image data to the second image data based on the angular displacement data.

17. The system of claim 12,
wherein the computer-readable memory is further encoded with instructions that, when executed by the one or more processors, cause the system to:
  determine, based on pixel locations of the identified target within the second image data and the output registered image data, that the identified target is moving; and
  output the guidance and control commands configured to modify the trajectory of the moving body based on the line-of-sight vector to intercept the identified target.

* * * * *